(No Model.)
J. CLARK.
CAR COUPLING.
No. 531,099. Patented Dec. 18, 1894.
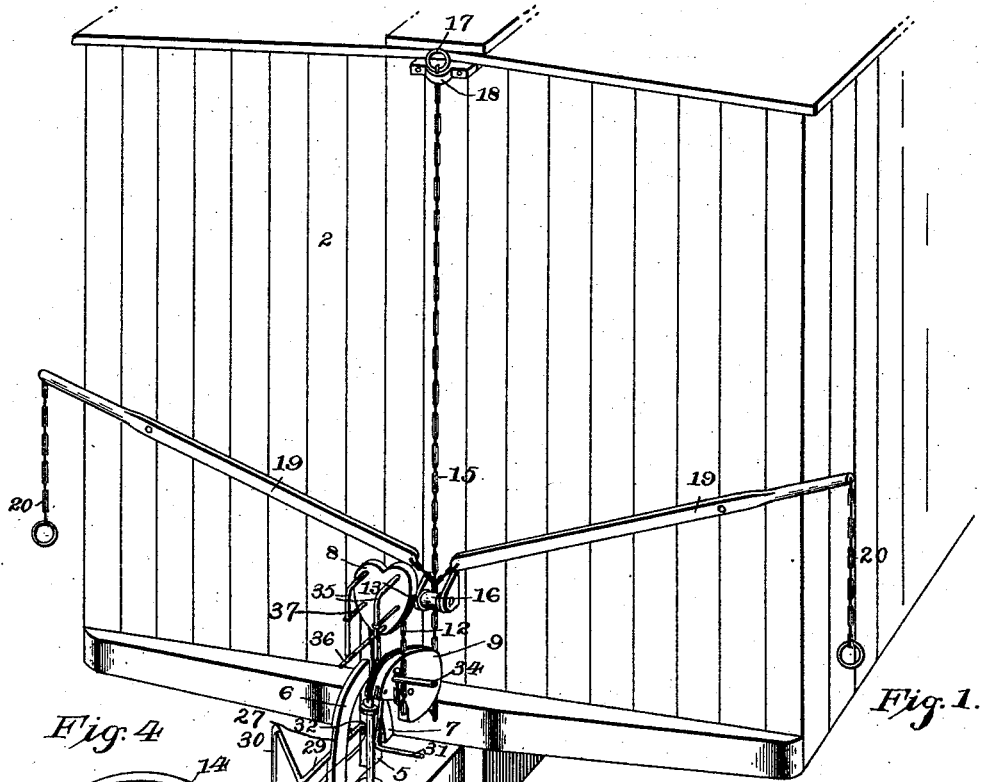
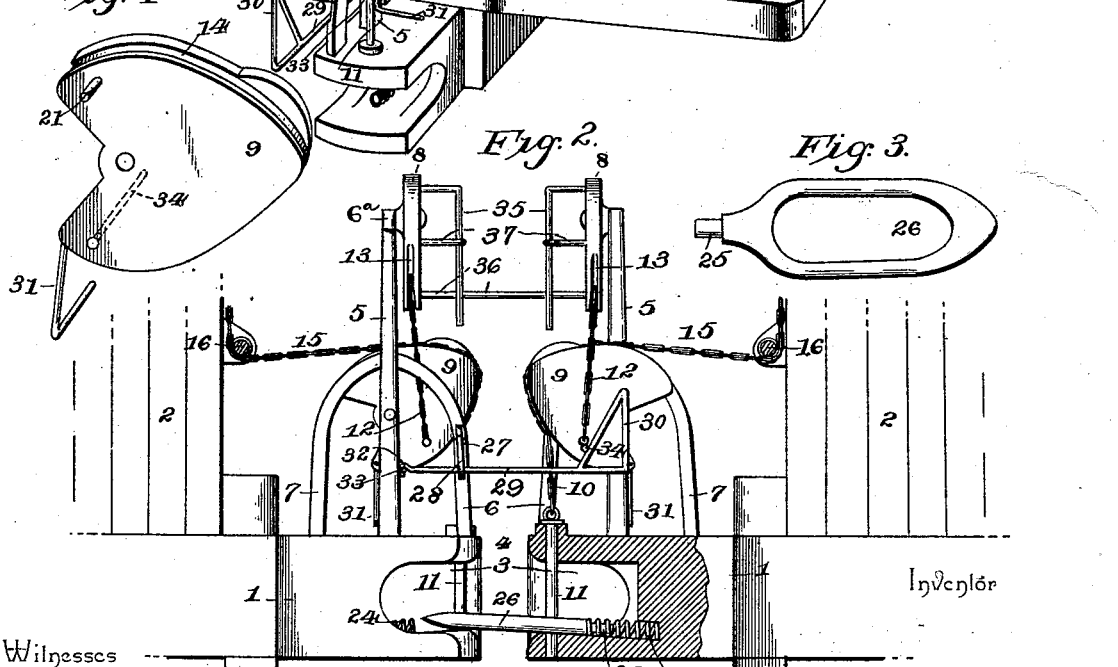
Witnesses
Chas. Ford
J. J. Riley
Inventor
Joel Clark,
By his Attorneys,
C. A. Snow & Co.

UNITED STATES PATENT OFFICE.

JOEL CLARK, OF HARTLAND, ASSIGNOR OF ONE-HALF TO NELSON CLARK, OF SPOKANE, WASHINGTON.

CAR-COUPLING.

SPECIFICATION forming part of Letters Patent No. 531,099, dated December 18, 1894.

Application filed July 11, 1894. Serial No. 517,167. (No model.)

*To all whom it may concern:*

Be it known that I, JOEL CLARK, a citizen of the United States, residing at Hartland, in the county of Klickitat and State of Washington, have invented a new and useful Car-Coupling, of which the following is a specification.

The invention relates to improvements in car couplings.

The object of the present invention is to improve the construction of car couplings, and to provide one which will be simple and comparatively inexpensive in construction, capable of automatic coupling, and of ready uncoupling without going between cars.

A further object of the invention is to provide a car coupling capable of automatically uncoupling in event of a car leaving the track for any reason whatever, such as being thrown down an embankment, or falling through a bridge, or the like to prevent the adjacent car from being dragged down with the derailed one.

The invention consists in the construction and novel combination and arrangement of parts hereinafter fully described, illustrated in the accompanying drawings, and pointed out in the claims hereto appended.

In the drawings: Figure 1 is a perspective view of a car coupling constructed in accordance with this invention, and shown applied to a car. Fig. 2 is a side elevation partly in section, showing two cars coupled. Fig. 3 is a detail view of the link. Fig. 4 is a detail perspective view of the lower heart-shaped cam.

Like numerals of reference indicate corresponding parts in all the figures of the drawings.

1 designates a draw-head mounted on a car 2 and having a link opening 3 and provided with a coupling pin perforation 4. The draw-head has mounted on it a vertical post 5 provided at the top with an inward extending laterally disposed arm $6^a$; and the post is braced and supported by front and rear braces 6 and 7, mounted on the draw-head, and having converging upper portions secured to the post. The post has mounted on it pivotally upper and lower heart-shaped cams 8 and 9, arranged to swing at right angles to each other, the upper one being pivoted intermediate of the ends of the laterally disposed arm $6^a$ and swinging transversely of the car coupling, and the lower one being pivoted to the inner face of the post near the center thereof, and being connected by a chain 10 with a coupling pin 11. The upper and lower heart-shaped cams are preferably constructed of metal, and are connected at opposite sides by chains 12, and the upper one is provided at its point with grooves 13 to receive the chains 12, whereby when the upper cam swings laterally, incident to a car being thrown over on one side, it will pull on the chains 12 and swing the lower cam upward and inward to raise the coupling pin for uncoupling.

The lower cam is provided with grooves 14, to receive the chain 10 and a chain 15, which may form a continuation of the chain 10, or be constructed separately as desired, and which extends inward under a pulley or sheave 16 of the car, and then upward to the top of the car. The upper end of the chain 15 is provided with a ring 17, and is arranged in a keeper 18, to enable the operation of uncoupling to be performed from the top of a car. Operating levers 19 are pivoted at opposite sides of the car, and project slightly therefrom. Their inner ends are connected by short chains with the chain 15; and their outer ends are provided with depending chains 20, terminating at the lower ends in rings arranged within easy reach from the ground, to enable the operation of uncoupling to be performed from either side of the car, to avoid going between cars.

The lower heart-shaped cam is inverted. Its forward movement is limited by the side chains 12, and its rearward swing is limited by a stop pin 21 arranged to engage the post, to prevent the coupling pin from being entirely withdrawn from the coupling pin perforation of the draw-head.

Within the draw-head is mounted a longitudinally disposed spring 24, which is spirally coiled, and which has its front end free, and adapted for the reception of a shank 25 of a link 26. The link 26 has a tapering beveled front end, and its inner or rear end terminates in the said shank 25, which fits in the spiral spring, whereby the link is cushioned, and is held in proper position for guiding it into the mouth of a corresponding draw-head.

The front brace 6 of the post or standard 5 is provided with a vertical recess 27, and confined therein detachably by a spring 28, is a trip bar 29, detachably secured at its inner end to the post. The outer end of the trip bar is provided with a triangular loop 30, adapted when cars come together for coupling, to engage a swinging angle arm 31 of the lower cam of a corresponding car coupling, whereby the latter is operated to swing its lower cam forward or downward to cause the coupling pin to fall into engagement with the link for coupling. The inner end of the trip bar is provided with a hook 32, which engages an eye 33 of the post; and the trip bar may be readily detached as the lower end of the spring 28 is free to permit the same to be removed from the recess.

In order to cause cars to automatically uncouple should one of them drop through a bridge, or the like, and to prevent one car from dragging another after it, the lower heart-shaped cam is provided with a rigid horizontally disposed arm 34 located above the trip bar, and adapted to be engaged by the latter. Each upper heart-shaped cam is provided with a pair of depending rods 35 offset from the cam, and a horizontally disposed outward extending operating rod 36 located between the depending rods, and projecting beyond the same, in order to engage the depending rods of the adjacent car, whereby, when one of the cams swings laterally of the draw-head, it will, through the medium of its horizontal rod 36, operate the other upper cam, whereby the coupling pins of both cars will be raised to uncouple the cars. The depending offset rods consist of L-shaped pieces having the upper arms secured to the cams, and the depending arms or main portions of the rods are supported by braces 37 extending from the cam and terminating at their outer ends in eyes, to receive the depending offset rods.

It will be seen that the car coupling is simple and comparatively inexpensive in construction, that it is positive and reliable, and that it is capable of automatic coupling. It will also be seen that the car coupling is capable of automatically uncoupling in event of one car leaving the rails, in order to prevent the derailed car from dragging another one with it.

Changes in the form, proportion, and the minor details of construction may be resorted to without departing from the principle or sacrificing any of the advantages of this invention.

What I claim is—

1. In a car coupling, the combination of a draw-head, a coupling pin mounted therein, a laterally swinging cam connected with the coupling pin, and means adapted to engage said cam and capable of automatically actuating said cam to raise the pin should a car fall over on its side, substantially as described.

2. In a car coupling, the combination of a draw-head, a transversely swinging cam mounted above the draw-head and loosely connected with the coupling pin, vertically disposed rods mounted on the cam and offset therefrom, and an outward extending rod mounted on the cam and located between the vertical rods and projecting beyond the same and adapted to engage the rods of a corresponding car coupling, substantially as and for the purpose described.

3. In a car coupling, the combination of a draw-head, a coupling pin mounted therein, a substantially heart-shaped cam mounted above the draw-head and arranged to swing longitudinally thereof, and loosely connected at its top with the coupling pin, means for limiting the swing of the cam, a chain extending from the cam to a car and located in rear of the former and attached to the bottom of the same and designed to terminate at the top of the car and the side operating levers connected with the chain, whereby the operation of uncoupling may be performed from the sides of a car, substantially as described.

4. In a car coupling, the combination of a draw-head, a coupling pin mounted therein, a cam mounted above the draw-head arranged to swing longitudinally thereof and connected with the coupling pin, said cam being provided with means for limiting its swing, a swinging angle arm mounted on the cam and depending therefrom, and a trip-bar extending outward beyond the draw-head for engaging the angle arm, substantially as described.

5. In a car coupling, the combination of a draw-head, a coupling pin mounted therein, a cam located above the draw-head and loosely connected with the coupling pin and arranged to swing longitudinally of the draw-head, and provided with a rigid laterally extending arm, a swinging angle arm depending from the cam, and a trip bar projecting from the draw-head and provided at its outer end with an upward extending triangular loop and adapted to engage the axle arm of a corresponding coupling, substantially as described.

6. In a car coupling, the combination of a draw-head provided with a post and having a front brace 6 provided with a vertical recess, a spring secured to the brace and extending across the recess and having one end free, the trip bar detachably secured at its inner end to the post and confined in the recess by the spring and provided at its outer end with an upward extending triangular loop, a coupling pin mounted in the draw-head, a cam pivoted on the post and loosely connected with the coupling pin and provided with outward extending arms adapted to be engaged by a trip bar, substantially as described.

7. In a car coupling, the combination of a draw-head, a post mounted thereon and provided at its top with a laterally disposed arm, the front and rear braces supporting the post, a coupling pin mounted on the draw-head, a lower cam fulcrumed on the post and loosely connected with the coupling pin, and arranged to swing longitudinally of the draw-head, an upper cam pivoted on the laterally extending arm of the post and arranged to swing transversely of the draw-head, chains arranged at opposite sides of the lower cam and loosely connecting the cams, and means for swinging the lower cam from the top and sides of a car, substantially as described.

8. In a car coupling, the combination of a draw-head, a coupling pin mounted in the draw-head, the upper and lower heart-shaped cams arranged above the draw-head and located respectively transversely and longitudinally of the draw-head, connections between the cams and the coupling pins, and means for operating the cams, substantially as described.

In testimony that I claim the foregoing as my own I have hereto affixed my signature in the presence of two witnesses.

JOEL CLARK.

Witnesses:
MAYBELL MURPHY,
W. R. DUNBAR.